US012792413B1

(12) United States Patent
Ramkumar et al.

(10) Patent No.: US 12,792,413 B1
(45) Date of Patent: Nov. 10, 2026

(54) PAGINATION ACROSS MULTIPLE DATA SOURCES

(71) Applicant: Amazon Technologies, Inc., Seattle, WA (US)

(72) Inventors: Srinivasan Ramkumar, San Jose, CA (US); Hoang Do Minh Le, San Jose, CA (US); Tivakar Komara Swami, Sunnyvale, CA (US); Joseph Lam, San Jose, CA (US); Rajesh Yarlagadda, San Jose, CA (US); Anant Prakash Srivastava, Sunnyvale, CA (US); Anand Garg, San Jose, CA (US); Jagathshree Suryanarayanan Iyer, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 307 days.

(21) Appl. No.: 18/758,535

(22) Filed: Jun. 28, 2024

(51) Int. Cl.
*G06F 9/50* (2006.01)

(52) U.S. Cl.
CPC .................................. *G06F 9/5038* (2013.01)

(58) Field of Classification Search
CPC ..................................................... G06F 9/5038
See application file for complete search history.

(56) References Cited

U.S. PATENT DOCUMENTS 11,200,213 B1 12/2021 Courchaine et al.
2012/0271845 A1 10/2012 Netz et al.
2017/0300552 A1* 10/2017 Mandadi .............. G06F 16/282
2017/0351697 A1 12/2017 Brosch
2021/0334316 A1* 10/2021 George ............. G06F 16/24568
2024/0078234 A1* 3/2024 Xie ........................ G06F 16/217
2024/0220493 A1* 7/2024 Gisby ................. G06F 16/2452

OTHER PUBLICATIONS

Microsoft, "How to pass pagination token during the API request (HTTP Connector) in copy activity?" retrieved Apr. 8, 2024 URL: https://learn.microsoft.com/en-us/answers/questions/440065/how-to-pass-pagination-token-during-the-api-reques, in 3 pages.

(Continued)

*Primary Examiner* — Jorge A Chu Joy-Davila
(74) *Attorney, Agent, or Firm* — Knobbe, Martens, Olson & Bear, LLP

(57) ABSTRACT

Systems and methods are described for determining task statuses regarding tasks being performed by multiple data sources. A pagination system may receive a request for data regarding tasks being performed by multiple data sources. The pagination system may access a first data source and obtain a first subset of data responsive to the request and may further obtain a local availability token indicating an availability of additional data regarding the tasks being performed by the first data source. From the local availability token, the pagination system may generate a global pagination token indicating a start point of a second subset of the data responsive to the request and a second data source of the multiple data sources from which to obtain the second subset of data, the pagination system may then obtain the second subset of data from the second data source beginning at the indicated start point.

20 Claims, 5 Drawing Sheets

(56) References Cited

OTHER PUBLICATIONS

Phyllo, "How to Implement Pagination with the Instagram API," retrieved Apr. 8, 2024 URL: https://www.getphyllo.com/post/how-to-implement-pagination-with-the-instagram-api, in 18 pages.

Stack Overflow, "How do I paginate my mysql query using AWS rds-data using boto3 and AWS-aurora?" retrieved Apr. 8, 2024 URL: https://stackoverflow.com/questions/62221470/how-do-i-paginate-my-mysql-query-using-aws-rds-data-using-boto3-and-aws-aurora, in 2 pages.

* cited by examiner

PAGINATION ACROSS MULTIPLE DATA SOURCES

BACKGROUND

Companies and organizations operate computer networks that interconnect a number of computing devices to support operations or provide services to third parties. The computing systems can be located in a single geographic location or distributed across many locations and interconnected using public or private communication networks. Users may leverage multiple databases within these networks in supporting operations and providing services to third parties, with each database platform performing a variety of operations, such as storage, manipulation, retrieval, or other management of data.

To facilitate management of the databases, users may leverage monitoring tools. These monitoring tools may only be able to monitor the one database at a time, which may increase latency and usage of computing resources in monitoring multiple databases engaged in operations relating to a user's data.

DETAILED DESCRIPTION

Figure 1:
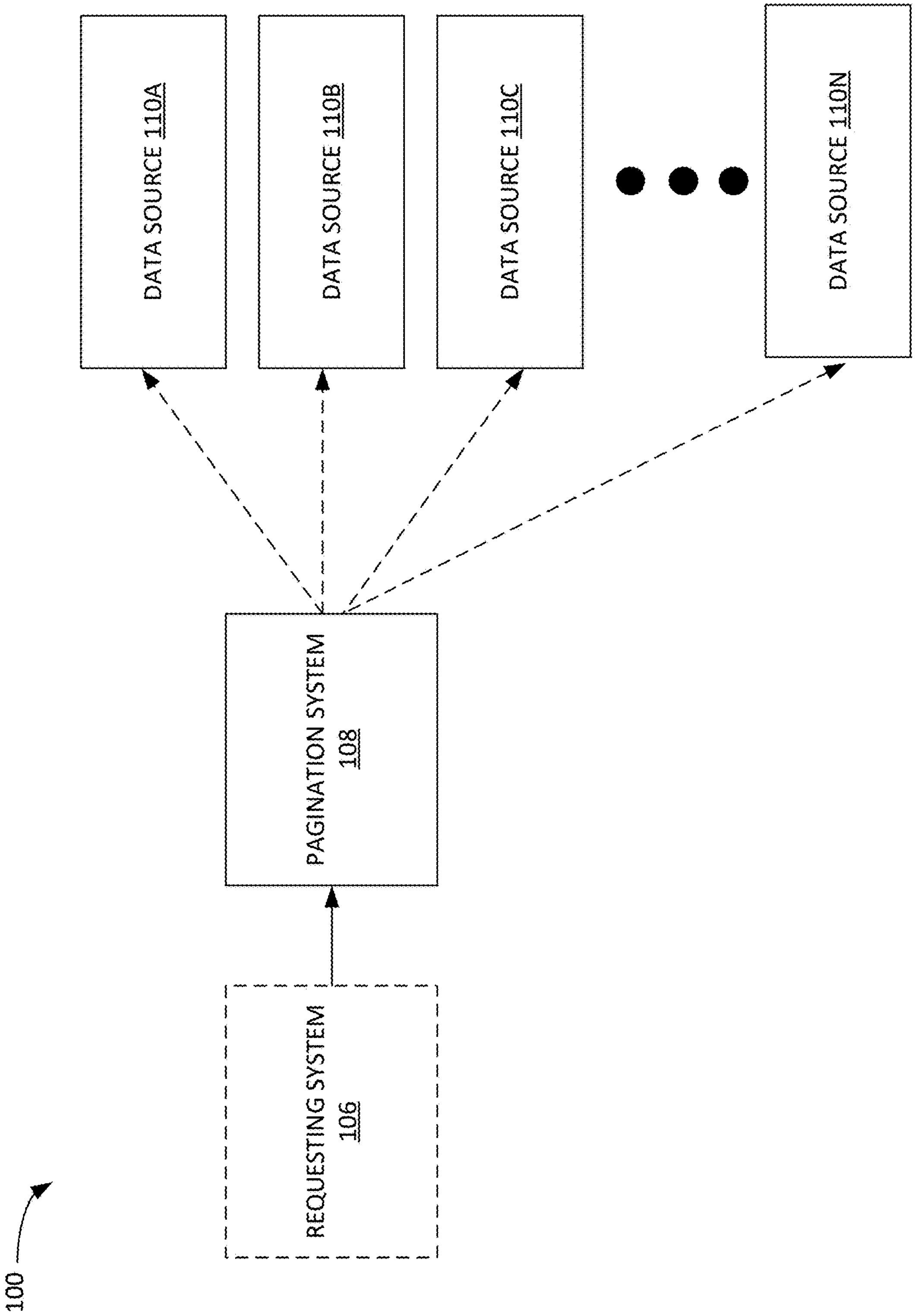
FIG. 1 illustrates an example computing environment in which aspects of the present disclosure may be implemented.

Generally described, the present disclosure relates to aggregating statuses of tasks being performed by multiple data sources (e.g., a relational database, in-memory data stores, NoSQL databases, etc.). A user may maintain data in multiple data sources to support different applications. Some data sources, such as NoSQL databases, may have features to facilitate handling of large scale low latency applications. Some data sources may be better for storing long term data, such as by including built in mechanisms to improve persistence of data including, but not limited to, regularly taking snapshots of data or logging write operations to data. Relational databases may provide better support for applications where relationships between data are important. Accordingly, to support a variety of applications, users may end up with data spread across multiple data sources.

In some applications, users might want to monitor their data, such as by getting statuses of tasks being performed with respect to their data in different data sources. By way of illustration, a user may submit tasks to import or export data to each of multiple data sources. These tasks may take time to complete, and a user may want to monitor the statuses of each of these tasks as performed by each of the data sources that store the user's data.

Typical approaches to monitoring data, such as task statuses, in data sources involve requesting each data source for such data individually. Since each request could return numerous task statuses for each data source, conventional systems typically provide task statuses to a user in discrete subsets. To provide the discrete subsets, a pagination process is typically used. A pagination process returns "pages," where each page represents a discrete subset of results, such as task statuses, which are presented to a user. Pages can be presented to a user until all results have been returned for a request. To provide context for where to retrieve the next page, a typical pagination process uses tokens (e.g., a hash, etc.), to provide an indication of where to begin accessing the next page of results. Pagination has typically been limited to a single database because the tokens indicating where to begin accessing the next page of results typically only provide data with respect to a single database.

Accordingly, to get task statuses from multiple data sources, an end user (hereinafter "user") needed to request task statuses from each data source individually through a computing system. However, requesting information from each data source individually increases latency and usage of computing resources in obtaining this information. Moreover, it limits the user's ability to view a complete picture of what is happening with respect to their data, which can improve a user's ability to draw insights from the task statuses. By way of illustration, a user can more easily determine if a data migration task between a first and second data source has been completed if the user knows that export tasks relating to the migration in a first data source have been completed and/or that import tasks with respect to the migration in the second data source have been completed.

Aspects of the present disclosure address the deficiencies described above with respect to existing techniques by providing a pagination system which can access and provide results, such as task statuses, from multiple databases. In some examples, a user may submit a task status request with respect to multiple data sources to a requesting system (e.g., an API, file transfer services, batch scripting services, etc.). The requesting system may leverage a pagination system to access the task statuses from multiple data sources.

To provide results from multiple data sources, the pagination system may generate and maintain a global pagination token to provide context as to the availability and location of a next subset (e.g., page) of task statuses. This can involve determining an access order for the multiple data sources and determining a start point within the multiple data sources to access the next subset of data. The start point may be determined based on contextual data obtained with each page of data from a specific data source. The global pagination token may, in some examples, incorporate a timestamp. Use of timestamps may improve integrity the global pagination token, such as by serving as a record of when the global pagination token was created, by serving as a stable start point to access the next set of records, the like, or some combination thereof.

By way of illustration, the pagination system may determine an access order for the multiple data sources. In response to a pagination request from the requesting system, the pagination system may access the first data source in accordance with the access order. The pagination system may obtain a first subset (e.g., page) of task statuses from the first data source and a local pagination token, where the local pagination token may be an incrementing counter or other contextual information (e.g., a hash, a data location, a time, etc.) indicating an availability of a next page of task statuses from the first data source, such as that there are more results to be obtained from the first data source or that a next data source should be accessed to obtain more task statuses. Based on this information, the pagination system may generate a global pagination token including a start point for a next subset (e.g., page) of task statuses. When obtaining the next subset of task statuses, the pagination system can extract the start point from the global pagination token to determine which data source should be accessed and the start point from which to begin obtaining the next subset of task statuses. The global pagination token can then be updated to indicate a new start point based on contextual information indicating an availability of data from the data source from which the next subset of task statuses was accessed, such as a local pagination token from the previously accessed data source. This process may continue until a stopping point has been reached, such as when a threshold number of task statuses have been returned or when all task statuses have been returned.

The above-described aspects and other aspects of the disclosure will now be described with regard to certain examples, embodiments, and aspects, which are intended to illustrate, but not limit, the disclosure. The foregoing aspects and many of the attendant advantages of this disclosure will become more readily appreciated as the same become better understood by reference to the following description, when taken in conjunction with the accompanying drawings.

FIG. 1 illustrates an example computing environment 100 in which aspects of the present disclosure may be implemented. The computing environment 100 includes requesting system 106, pagination system 108, and data sources 110A-110N. The requesting system 106 may communicate with the pagination system 108 to obtain data, such as task statuses, from one or more of data sources 110A-110N-1, and 110N (hereinafter 110A-110N).

Data sources 110A-110N may be any network-accessible data management systems. Data sources 110A-110N include, but are not limited to, relational databases, NoSQL databases, and in-memory databases. Moreover, data sources 110A-110N may be hosted by one or more entities. By way of example, at least some of data sources 110A-110N may be databases supported by a network provider that interconnects a number of computing devices to support operations or provide services to third parties. Each data source of data sources 110A-110N may include, but is not limited to, data relating to tasks being performed. Data relating to tasks being performed may include, but is not limited to, task statuses, a record of data items yet to be exported from the data store for an export task, a record of data items yet to be imported for a data import task, the like, or some combination thereof.

The requesting system 106 may be any network accessible service with an interface, such as an application programming interface (API), that facilitates communication between a user and data sources 110A-110N. The requesting system 106 may take requests submitted by a user as input, such as requests relating to data storage, data retrieval, manipulation, monitoring, the like, or some combination thereof. In response to a user request, the requesting system 106 may call pagination system 108 to obtain results from the data sources 110A-110N.

Illustratively, the requesting system 106 may take as input a task status request to request the statuses of tasks being performed by one or more of data sources 110A-110N. In response to a task status request, for example, the requesting system 106 may submit a pagination request to the pagination system 108 to return a page or pages of task statuses responsive to the task status request from data sources 110A-110N, where each page represents a portion (also referred to herein as a "subset") of task statuses responsive to the request. The process by which the pagination system 108 returns the page or pages of tasks statuses responsive to a task status request will be discussed in more detail in FIGS. 2A-3.

While FIG. 1 includes a requesting system 106, this is not intended to be limiting. In some examples, the requesting system 106 may be omitted. Instead, the user may communicate directly with the data sources 110A-110N. The user may additionally, or alternatively, communicate with the data sources 110A-110N through the pagination system 108. The pagination system 108 may, for example, receive a request specifying multiple data sources, such as a task status request, directly from a user through a computing device (e.g., phone, laptop, desktop, etc.). In response to the request, the pagination system 108 may return the results, such as task statuses, divided into one or more subsets.

The pagination system 108 may be any network accessible service with an interface, such as an application programming interface (API), that facilitates accessing and/or obtaining data sources 110A-110N in one or more subsets, as described herein. To return results from multiple data sources divided into one or more subsets, the pagination system 108 may generate a global pagination token (also referred to herein as a "global availability token.") The global pagination token may include a start point for the next subset of results (e.g., task statuses), such as a location in at least one of data sources 110A-110N. The global pagination token may, in some examples, include one or more timestamps. A timestamp may illustratively improve the integrity of the global pagination token by serving as a record of when the global pagination token was created, which may be used to determine whether the global pagination token has expired. If expired, then an end user or requesting service may be instructed to submit a new pagination request. The timestamp may additionally, or alternatively, serve as the start point for the next set of results. By way of illustration, a first subset of results may include data items created between a first time and a second time. The timestamp may indicate the second time, so the next subset of results may begin with data items created after the second time. The global pagination token may further include an access order indicating an order in which to access the data sources specified in a request, such as a task status request, a pagination request, the like, or some combination thereof.

The access order may be used to determine the next start point in a previously accessed data source or a distinct data source. As will be discussed in FIGS. 2A-2B, for example, the access order may include a first data source followed by a second data source. The pagination system 108 may obtain a local pagination token (e.g., a hash, an incrementing variable, etc.) from the first data source that indicates the availability of a next subset of results from the first data source. If the local pagination token (also referred to herein as a "local availability token") indicates that no further results are available from the first data source, the pagination system 108 may determine the next start point is in the second data source and store this information as part of the global pagination token, such as by generating a global pagination token to include this information or updating a global pagination token to include this information. This global pagination token will then be used in accessing the next subset of data, and the process will repeat until a stopping point is reached, such as a threshold number of results has been returned or all results to the request have been returned. Generation or updating of a global pagination token will be discussed in more detail in FIG. 3.

The subsets of results obtained by the pagination system 108 in response to a request (e.g., a task status request, a pagination request, etc.) may be returned to the requesting system 106 or to a user (e.g., via a computing device). Illustratively, with respect to a task status request, the pagination system 108 may return each subset of task statuses as they are obtained to the requesting system 106, which provides the subset of tasks statuses to the user that submitted the task status request.

In some examples, a user may submit a task or tasks to data sources 110A-110N relating to management of data within data source 110A including, but not limited to, movement of data (e.g., importing data, exporting data, etc.), reading data, writing data, modifying data, the like, or some combination thereof. The user may submit tasks to multiple data sources, such as at least two of data sources 110A-110N. The user may want to obtain data relating to tasks performed by the data sources 110A-110N, such as statuses of the tasks, data involved in performance of the tasks, the like, or some combination thereof. Statuses of the tasks may include, but are not limited to, that the task is complete, that the task is incomplete, progress of the task towards completion, the like, or some combination thereof. Data involved in the performance of a task may include, but is not limited to, data being moved (e.g., imported, exported, etc.), data being read, data being modified, the like, or some combination thereof. To avoid unnecessary resource consumption or network congestion, the user may want the data relating to specified tasks in data sources 110A-110N to be returned in subsets. For example, as will be described in FIG. 2A-2B, the pagination system 108 may obtain subsets of task statuses responsive to a task status request for statuses of tasks performed by data sources, such as data sources 110A-110N.

Figure 2A:
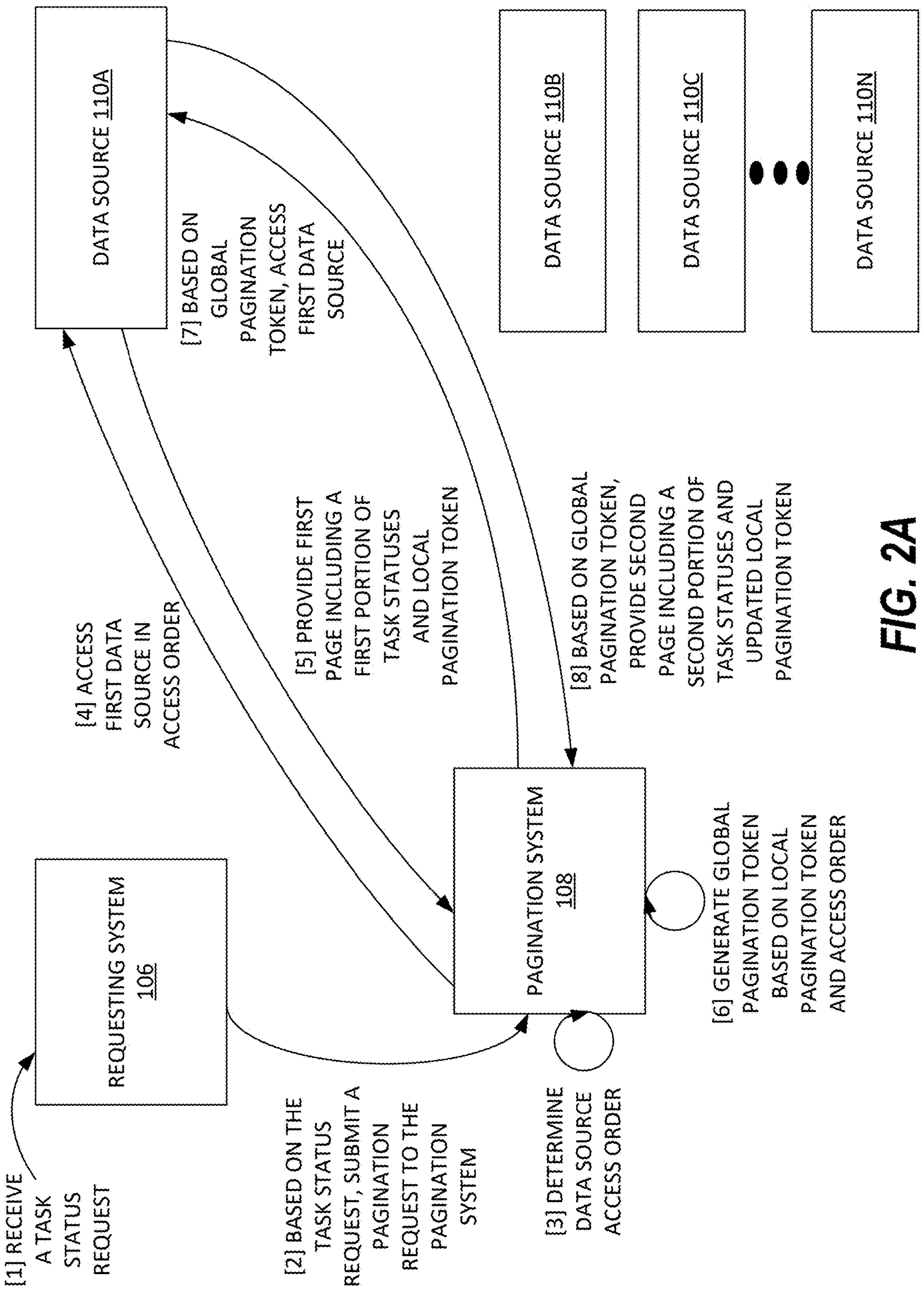
FIG. 2A depicts illustrative interactions between a requesting system, a pagination system, and one or more data sources to obtain statuses of tasks performed by the one or more data sources.

FIG. 2A depicts illustrative interactions between requesting system 106, pagination system 108, and data source 110A to obtain statuses of tasks performed by data sources 110A-110N. At [1], the requesting system 106 receives a task status request, such as from the user through a computing device. The task status request may include, but is not limited to, an identification of data sources to access, an identification of tasks for which status is requested, a unique identifier for each task, a unique identifier associated with a group of tasks, a unique identifier associated with the user who submitted the task, the like, or some combination thereof. In some examples, the task status request may further include a stopping point indicating a number of results that the user wishes to receive in response to the task status request.

Illustratively, a user through a computing device may submit a task status request to the requesting system 106 to obtain task statuses of tasks being performed in data sources 110A-110N. The submitted task status request may include identification of specified tasks and data sources of data sources 110A-110N that are performing these tasks. The submitted task status request may, for example, include a data structure (e.g., a table) including a column representing the specified tasks and a linked column specifying data sources performing those tasks. The specified tasks and specified data sources performing the specified tasks may be used, as will be discussed at [4]-[8] to identify the task statuses. For example, the task status request received at [1], may request the task statuses relating to recurring backups of data source 110A to data source 110B. The recurring backup may involve a set of tasks performed by data source 110A to export specified data items and a set of tasks performed by data source 110B to import the specified data items.

Alternatively, the task status request may include a specified unique identifier representing the user and a list of data sources among data sources 110A-110N. In each of data sources 110A-110N, the tasks being performed may be represented by metadata including the specified unique identifier. The specified identifier and the list of data sources may accordingly be used, as will be discussed at [4]-[8], to identify the task statuses corresponding to the unique identifier. The task status request received at [1] may, for example, request the status for all tasks associated with the user represented by a specified unique identifier and performed by data sources 110A-110N. The tasks may include recurring backups of data source 110A to data source 110B.

At [2], the requesting system 106 may generate a pagination request based on the task status request and provide this request to the pagination system 108. A pagination request may incorporate data of the task status request received at [1]. If the task status request includes specified tasks and specified data sources performing the specified tasks, the pagination request will include the same. A task status request for recurring backups of specified data items from data sources 110A-110N may be translated by the requesting system 106 into a pagination request identifying the relevant data sources as data source 110A and data source 110B and the relevant tasks as import and export tasks for the specified data items. As another example, if the task status request includes a specified unique identifier representing the user and a list of data sources of data sources 110A-110N, the pagination request may also include the same. The pagination request may also include a page size indicating the number of task statuses that should be included in each subset. The pagination request may further include an identification of a stopping point, such as a threshold number of task statuses that should be returned before ceasing to obtain new subsets of results from data sources 110A-110N. The threshold number of task statuses may be a default value (e.g., one hundred results), which may be set by an administrator of the pagination system 108.

At [3], the pagination system 108 may determine a data source access order. The data source access order may be an order in which to obtain task statuses responsive to the pagination request generated by the requesting system 106 at [2]. The data source access order may be a default order of the data sources 110A-110N provided by an administrator of the pagination system 108.

The access order may additionally, or alternatively, be provided in the pagination request received at [2]. As discussed above at [2], the pagination request may include a list of data sources of data sources 110A-110N. With continued reference to the illustrative example of a recurring backup between data source 110A and data source 110B, the task status request and corresponding pagination request may provide that data source 110A is the first data sources in an access order. The data source access order determined at [3] may match the order of the list of data sources included in the pagination request.

As another example, the pagination system 108 may determine the access order based on a specified unique identifier representing a user if present in the pagination request received at [2]. Illustratively, the pagination request received at [2] may include a specified unique identifier for a user, which may be associated with an account of the user with a network service provider hosting the data sources of data sources 110A-110N. The account of the user may correspond to preferences with respect to data sources 110A-110N, such as a preference to use data source 110A to store data items that the user accesses frequently, such as on a daily basis. The pagination system 108 may be able to access this preference from the network service provider with the specified unique identifier for the user. Based on this preference, the pagination system 108 may set data source 110A as the first data source in the data source access order determined at [3].

At [4], the pagination system 108 may access the first data source in the access order, where the first data source in the access order is data source 110A. This is not intended to be limiting. Any of data sources 110A-110N may be determined to be the first data source in the access order determined at [3]. In accessing data source 110A, the pagination system 108 may further provide the data source 110A with details included in the pagination request, such as, an identification of tasks for which status is requested, a unique identifier for each task, a unique identifier associated with a group of tasks, a unique identifier associated with the user who submitted the task, the number of results which should be present in each subset task statuses returned by the data source 110A to the pagination system 108, the like, or some combination thereof.

At [5], the data source 110A may provide the first portion of task statuses (also referred to herein as "subset of task statuses") and the local pagination token to the pagination system 108. The data source 110A may, in some examples, support pagination (e.g., cursor-based pagination, offset-based pagination, etc.) As discussed with respect to [4], the pagination system 108 may provide the data source 110A with details included in the pagination request including a requested number of tasks statuses to be included in each subset of task statuses returned to the pagination system 108. The data source 110A may first determine a "results set," where the "results set" includes task statuses responsive to the pagination request within the data source 110A. With respect to the example of a recurring backup of specified data items between data source 110A and data source 110B, the data source 110A may identify statuses of export tasks relating those specified data items as the "results set."

When each subset of tasks statuses is provided, the data source 110A may determine an offset, where the offset indicates the availability of further task statuses in the "results set." The pagination system 108 may use the offset as a local pagination token indicating availability of task statuses within the "results set" of data source 110A. For example, the offset may indicate a number of tasks statuses in the "results set" that have already been provided. This may provide a start point for the next set of task statuses within the "results set." Alternatively, the offset may indicate that all results in the "results set" have been provided to the pagination system 108. The offset may, in some examples, be determined based on a hash of the previous subset of tasks statuses provided with respect to the "results set." Data source 110A may provide the offset with the first subset of results as a local pagination token indicating the availability of further task statuses responsive to the pagination request within data source 110A.

While the local pagination token is described as a hash in the example above, this is not intended to be limiting. For example, the local pagination token may alternatively be an incrementing variable. By way of illustration, the pagination system 108 may identify a "results set" of all task statuses identified as responsive to the pagination request in data source 110. After each subset of task statuses has been received, the pagination system 108 may maintain an incrementing variable indicating a number of data items (e.g., task statuses) that have been obtained by the pagination system 108. The pagination system 108 may maintain the incrementing variable by updating the incrementing variable during or after receipt of each subset of task statuses. The pagination system 108 may maintain the incrementing variable within data source 110A or within a memory of the pagination system 108. The pagination system 108 may use the incrementing variable as a local pagination token indicating availability of task statuses within the "results set" of data source 110A. In some examples, the incrementing variable may also reflect timestamps. Illustratively, the incrementing variable may indicate the timestamp of the last data item obtained by the pagination system 108, the timestamp of the first data item in the next subset to be obtained, the like, or some combination thereof.

With continued reference to the example of a recurring backup of specified data items between data source 110A and data source 110B, the "results set" may include one hundred task statuses for export of the specified data items by data source 110A. Each subset may be twenty pages. The incrementing variable serving as a local pagination token may be set at zero prior to provision of a first subset of task statuses at [5]. During or after [5], the incrementing variable may be updated to twenty. When the next subset is provided by the data source 110A, the next subset may begin at the twenty-first task status in the "results set," based on the local pagination token.

While [5] describes that the data source 110A provides a first subset of task statuses to the pagination system 108, this is not intended to be limiting. The pagination system 108 may instead obtain subsets of task statuses from the data sources 110A-110N, such as by downloading them.

At [6], the pagination system 108 may generate a global pagination token based on the local pagination token. The global pagination token may indicate the start point for the next set of task statuses responsive to the pagination request within at least one of data sources 110A-110N. The pagination system 108 may, for example, determine that the start point for the next subset of task statuses is in the data source 110A.

As discussed with respect to [5], the local pagination token for data source 110A may indicate that further task statuses are available in the "results set" of data source 110A, where the "results set" identifies task statuses responsive to the pagination request within the data source 110A. The local pagination token may further indicate a start point for the next subset of task statuses in the "results set." The pagination system 108 may generate the global pagination token to include the start point within the "results set" of data source 110A. With continued reference to the example of a recurring backup of specified data items between data source 110A and data source 110B, where the local pagination token is an incrementing variable, the global pagination token may indicate that the start point for the next subset of task statuses is the twenty-first task status in the "results set." As will be discussed in more detail with respect to FIG. 3, the global pagination token may contain an encrypted and/or encoded form of the local pagination token. If the local pagination token for data source 110A has indicated that additional results are available in data source 110, the local pagination token may be decrypted and/or decoded and passed to data source 110A as input to receive the next subset of task statuses.

Figure 2B:
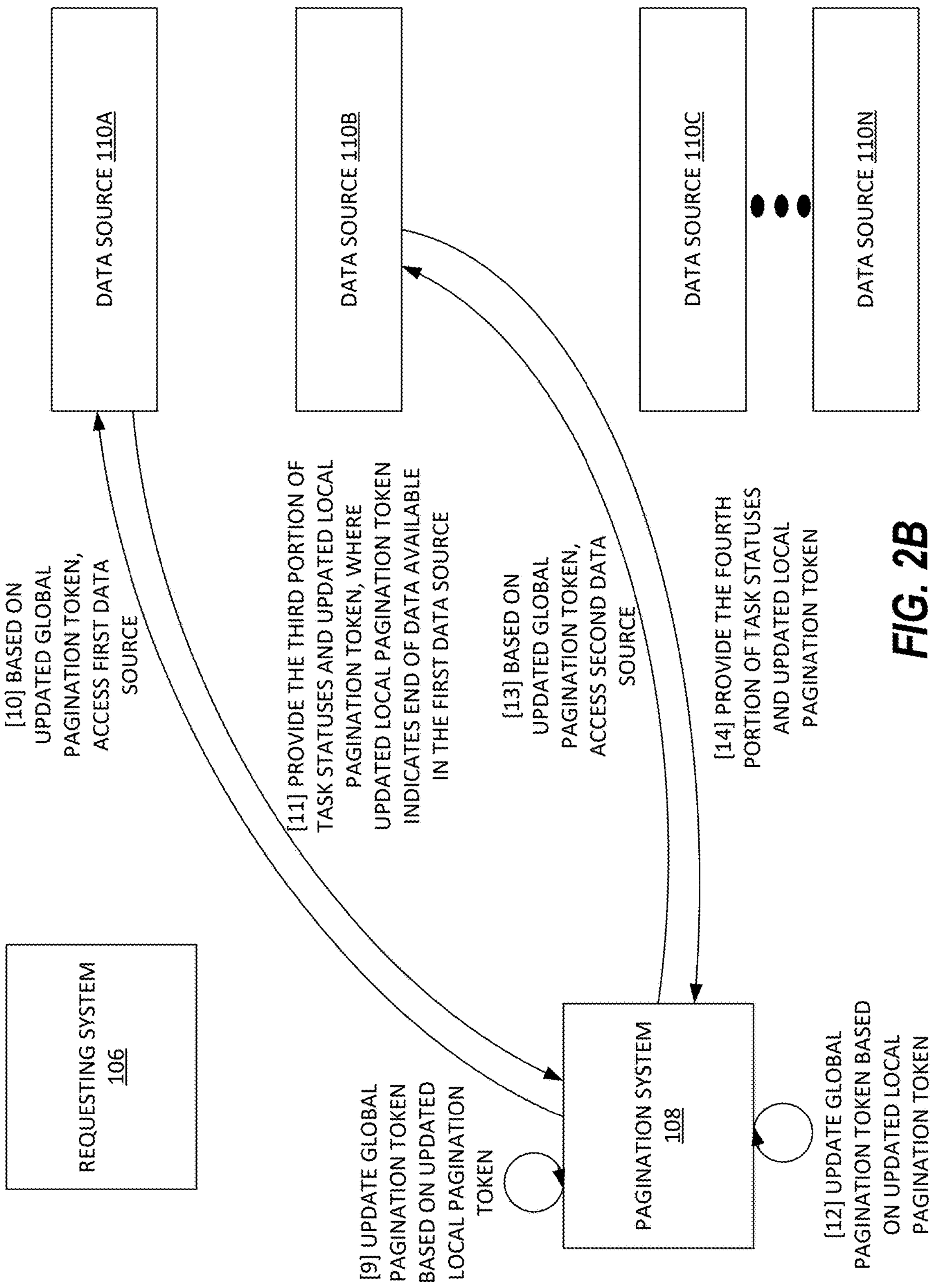
FIG. 2B depicts illustrative interactions between a requesting system, a pagination system, and multiple data sources to obtain task of tasks performed by multiple data sources.

In other examples, the local pagination token may indicate that no further task statuses are available in the "results set" of data source 110A. FIG. 2B discusses generation of a global pagination token where the local pagination token indicates that no further task statuses are available in the "results set" of data source 110A. Generation of the global pagination token is discussed in more detail with respect to FIG. 3.

At [7], the pagination system 108 may access data source 110A. As discussed at [6], the global pagination token may include a start point within the "results set" of data source 110A for the next subset of task statuses. When accessing data source 110A, the pagination system 108 may further provide the data source 110A with details included in the global pagination token such as, the start point provided in the global pagination token with respect to the "results set" of data source 110A. Other information may also be provided including, but not limited to, the number of results which should be present in each subset task statuses returned by the data source 110A to the pagination system 108.

At [8], the data source 110A may provide a second subset of task statuses and an updated local pagination token. As discussed with respect to [7], the second subset of task statuses may begin at the start point identified in the local pagination token received at [5] and included in the global pagination token generated at [6]. During the process of providing the second subset of task statuses to the pagination system 108, the local pagination token may be updated by the data source 110 or the pagination system 108 using any of the methods described with respect to [5].

FIG. 2B depicts illustrative interactions between a requesting system 106, a pagination system 108, and data sources 110A-110N to obtain statuses of tasks performed by multiple data sources. FIG. 2B may represent a continuation of the interactions of FIG. 2A after [8].

At [9], the pagination system 108 may update the global pagination token based on an updated local pagination token. As discussed with respect to FIG. 2A at [8], the local pagination token may be updated by the data source 110 or the pagination system 108 during the process of providing a subset of task statuses to the pagination system 108. The local pagination token may be updated to indicate an availability of further results in a previously accessed database, such as by providing a hash or an incrementing variable as discussed in FIG. 2A at [5]. The pagination system 108 may update the global pagination token to include a start point for a next subset of task statuses as a location in data source 110A, where the start point in the updated global pagination token matches a start point in the updated local pagination token for a next subset of task statuses.

At [10], the pagination system 108 may access data source 110A based on the updated global pagination token. As discussed with respect to FIG. 2A at [7], the global pagination token may include a start point within the "results set" of data source 110A for the next subset of task statuses. When accessing data source 110A, the pagination system 108 may further provide the data source 110A with details included in the global pagination token such as, the start point provided in the global pagination token with respect to the "results set" of data source 110A. Other information may also be provided including, but not limited to, the number of results which should be present in each subset task statuses returned by the data source 110A to the pagination system 108.

At [11], the data source 110A may provide a third subset of task statuses and an updated local pagination token indicating an end of data available in data source 110A. With continued reference to the example of a recurring backup of specified data items between data source 110A and data source 110B, where the local pagination token is an incrementing variable, the global pagination token may indicate that the start point for a one hundredth task status has been reached in the "results set."

The third subset of task statuses may begin at the start point included in the global pagination token generated at [9]. During the process of providing the third subset of task statuses to the pagination system 108, the local pagination token may be updated by the data source 110A or the pagination system 108 using any of the methods described with respect to FIG. 2A at [5]. The updated local pagination token may indicate an end has been reached in the "results set" of data source 110A. As a reminder, the "results set" may be a list of task statuses identified as responsive to the pagination request, as discussed with respect to FIG. 2A. As one example, when the end of the "results set" has been reached, the data source 110A may return a null value as the updated local pagination token at [11].

At [12], the pagination system 108 may update the global pagination token based on the updated location pagination token received at [11]. On receipt of the updated local pagination token indicating an end of data available in the data source 110A, the pagination system 108 may determine a start point for the next subset of task statuses in a different data source. As discussed with respect to FIG. 2A at [3], the pagination system 108 may determine an access order of data sources in which to obtain results responsive to the pagination request. The access order may indicate that data source 110B should be accessed after data source 110A. Accordingly, the pagination system 108 may update the global pagination token to indicate that the next subset of task statuses should be from data source 110B. This is not intended to be limiting. One or more data sources of data sources 110B-110N may be selected for access subsequent to receiving results from data source 110A.

At [13], the pagination system 108 may access data source 110B based on the updated global pagination token. With reference to [12], the pagination system 108 may also update the global pagination token to indicate that prior to obtaining the next subset of task statuses from data source 110B, a "results set" indicating task statuses responsive to the pagination request should be identified within data source 110B. For example, the pagination system 108 may identify the task statuses responsive to the pagination request in data source 110B. With continued reference to the example of a recurring backup of specified data items between data source 110A and data source 110B, the pagination system 108 may identify import tasks being performed by data source 110B with respect to the specified data items.

Alternatively, the pagination system 108 may provide data source 110B with the details of the pagination request, such as the number of task statuses to return in each subset, the tasks being sought, the like, or some combination thereof. With continued reference to the example of a recurring backup of specified data items between data source 110A and data source 110B, the pagination system 108 may provide data source 110B with identification of the specified data items and that the request tasks relate to importing the specified data items. The data source 110B may accordingly generate a "results set" of the status of import tasks with respect to the specified data items.

Illustratively, information regarding the tasks being sought may include that the tasks include metadata for a specified unique identifier or specified unique identifiers including, but not limited to, specific unique identifiers representing a user, specific unique identifiers representing specific tasks, specific unique identifiers representing a specific group or specific group of tasks, the like, or some combination thereof. The data source 110B may then identify a "results set" responsive to the pagination request.

At [14], the data source 110B may provide the fourth set of task statuses and an updated local pagination token to pagination system 108. The fourth set of task statuses may begin at the start of the "results set" of data source 110B and continue until a specified number of task statuses has been provided for the subset, as discussed with respect to [13]. As discussed at [11], the data source 110B may update the local pagination token (e.g., by generating an updated hash, incrementing a variable, etc.), and may be updated during provision of the fourth subsets of results.

While the interactions described with respect to FIGS. 2A-2B reference interactions between requesting system 106, pagination system 108 and data source 110A and data source 110B, this is not intended to be limiting. The pagination system may interact in a similar fashion with an $n^{th}-1$ data source and an $n^{th}$ data source. The interactions described in FIGS. 2A-2B may additionally, or alternatively, repeat. Illustratively, a task request, such as the one received at [1] of FIG. 2A may indicate that a user would like to receive task statuses including metadata for a specified user identifier in all data sources 110A-110N. Accordingly, the pagination system 108 may repeatedly update the global pagination token to access data sources 110A-110N and receive subsets of task statuses, as discussed above with respect to FIGS. 2A-2B. The pagination system 108 may for example, receive an updated local pagination token indicating that an $n^{th}$ page of statuses is not available from the $n^{th}-1$ data source and generate an updated global pagination token from the access order and the updated local pagination token, where the updated global pagination token indicates a start point for an $n^{th}$ page of statuses of the tasks.

Figure 3:
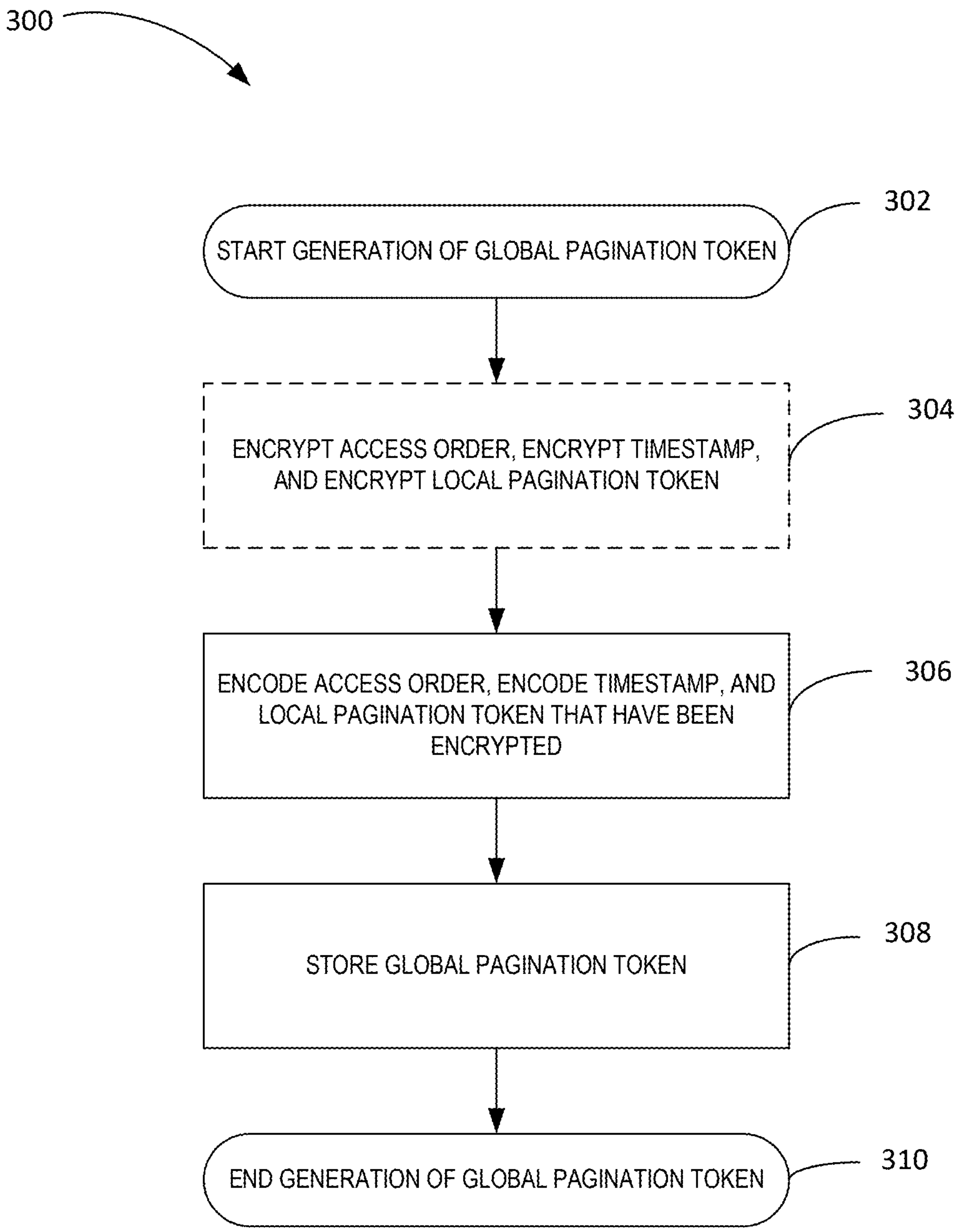
FIG. 3 illustrates an example method for generation of a global pagination token in accordance with some aspects of the disclosure.

FIG. 3 illustrates an example method 300 for generation of a global pagination token in accordance with some aspects of the disclosure. Method 300 may be implemented by pagination system 108. Method 300 begins at block 302.

At block 304, the pagination system 108 may encrypt the access order, encrypt a timestamp, and encrypt the local pagination token. With reference to FIG. 2A-2B, the access order may be an order in which to access data sources 110A-110N and obtain a list of results from data sources 110A-110N, such as task statuses, data relating to task statuses, other data responsive to a pagination request, the like, or some combination thereof. The timestamp may indicate when the global pagination token was created. The global pagination token may, in some examples, expire after a period of time measured from its creation. The timestamp may therefore be used to determine whether the global pagination token has expired. The expiration of the global pagination token may trigger an end user or requesting service (e.g., requesting system 106 of FIGS. 1-2B) to submit a new pagination request, as described with respect to FIGS. 2A-2B. The local pagination token may indicate the availability of further results from a previously accessed data source. Illustratively, the pagination system 108 may encrypt the access order and separately encrypt the local pagination token with a key for the pagination system 108. Encryption may advantageously reduce the risk of unauthorized access to the access order and local pagination token.

The global pagination token may incorporate the encrypted local pagination token, encrypted timestamp, and the encrypted access order, as will be discussed in more detail in block 306. The access order and local pagination token may be encrypted through encryption techniques such as, but not limited to, symmetric cryptography techniques, asymmetric cryptography techniques, the like, or some combination thereof. As one example, the pagination system 108 may have a key, such as a password, that may be used in encrypting and decrypting the access order and local pagination token, as will be discussed in more detail at block 308.

At block 306, the pagination system 108 may encode the encrypted access order, encrypted timestamp, and encrypted local pagination token to generate the global pagination token. Encoding the encrypted access order and encrypted local pagination token allow the global pagination token to include information indicating a start point for the next set of results in a pagination process involving multiple data sources, as described above with respect to FIGS. 2A-2B. Use of the generated global pagination token will be described in more detail at block 308.

The pagination system 108 may, for example, encode the access order, timestamp, and local pagination token as the global pagination token. Encoding the access order and local pagination token may facilitate pagination of results from multiple data sources, such as data sources 110A-110N of FIGS. 2A-2B, For example, incorporation of the access order and local pagination token into the global pagination token through encoding may be how the global pagination token indicates a start point for the next subset of results (e.g., task statuses) in multiple data sources, as will be discussed in more detail at block 308.

While block 308 describes the pagination system 108 as encoding the encrypted access order, encrypted timestamp, and the encrypted local pagination token to generate the global pagination token, this is not intended to be limiting. The pagination system 108 may, in some examples, encode unencrypted versions of the local pagination token, timestamp, and access order to generate the global pagination token.

At block 308, the pagination system 108 may utilize the global pagination token generated at block 306 to provide subsets of results responsive to a pagination request, as illustrated in FIGS. 2A-2B. For example, if the local pagination token is a null value indicating no further results are available in a current data source and the access order indicates the next data source, the pagination system 108 may generate and store a global pagination token with this information. To use the global pagination token, the pagination system 108 may decode and decrypt the global pagination token to get the local pagination token, timestamp, and access order and thereby determine the start point for the next subset of results as being in the next data source. The pagination system 108 may then proceed to access the next data source.

As another example, the local pagination token may indicate that further results are available in the current data source. The pagination system 108 may generate and store a global pagination token with this information using any of the methods described above with respect to blocks 304 and 306. To use the global pagination token, the pagination system 108 may decode and decrypt the global pagination token to get the local pagination token, timestamp, and access order to determine that the start point of the next set of results is still the current data source. The pagination system 108 may then proceed to access the current data source. The pagination system 108 may also provide the current data source with the decoded and decrypted local pagination token as input. The current data source may, in some examples, support pagination and provide the next subset of results based on the decoded and decrypted local pagination token. The current data source may, for example, extract a start point at which to begin the next set of results from the local pagination token. Method 300 ends at block 310.

Figure 4:
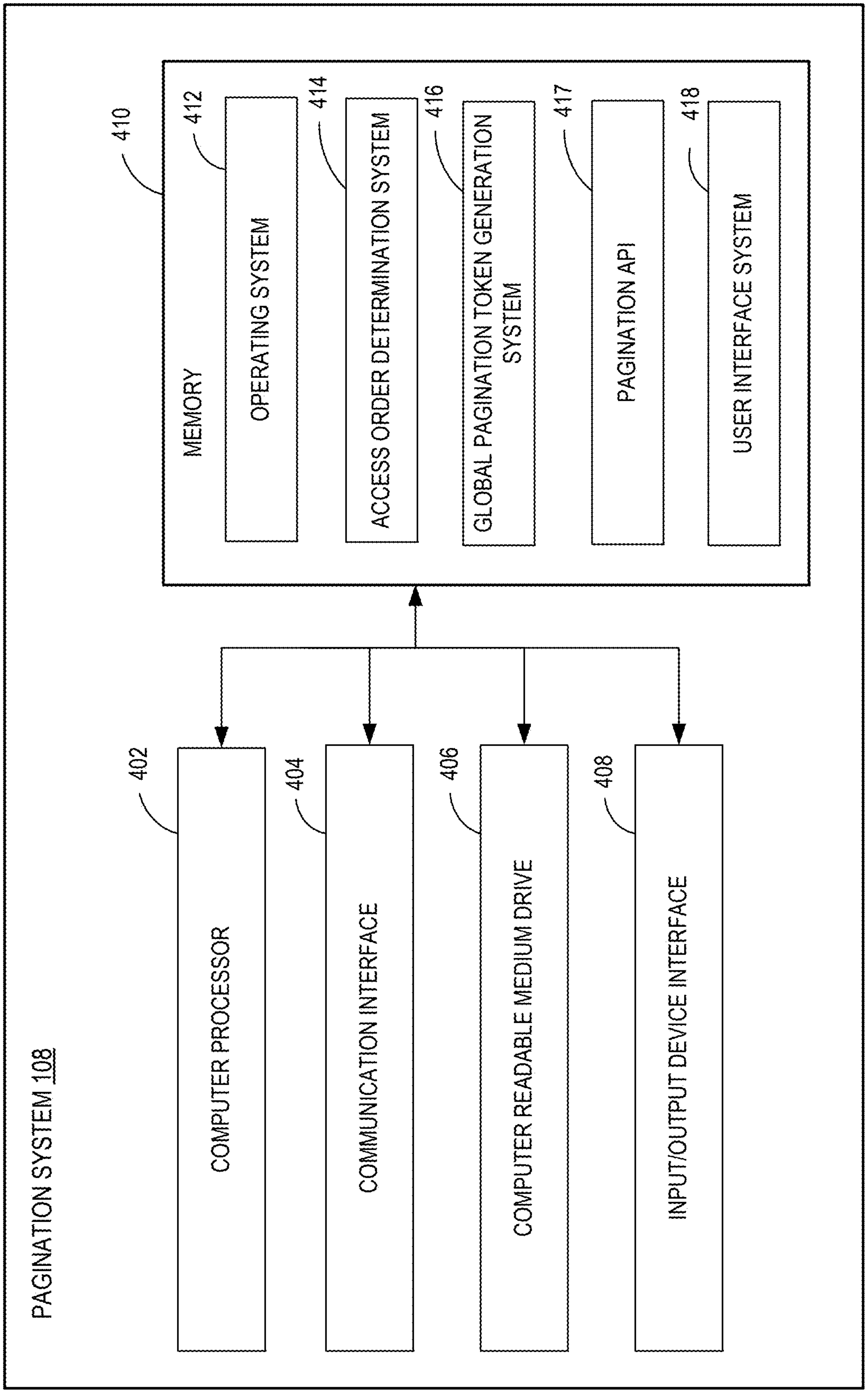
FIG. 4 depicts an example architecture of a server that can be used to perform one or more of the techniques described herein or illustrated in FIGS. 1-3.

FIG. 4 depicts an example architecture of the pagination system 108, which may be used to perform one or more of the techniques described herein or illustrated in FIGS. 1-3. The general architecture of the pagination system 108, as described in FIG. 4, includes an arrangement of computer hardware and software modules that may be used to implement one or more aspects of the present disclosure. The pagination system 108 may include many more (or fewer) elements than those shown in FIG. 4. It is not necessary, however, that all of these elements be shown in order to provide an enabling disclosure.

As illustrated, the pagination system 108 includes a computer processor 402, a communication interface 404, a computer readable medium drive 406, an input/output device interface 408, and a memory 410, all of which may communicate with one another by way of a communication bus. The communication interface 404 may provide connectivity to one or more networks or computing systems. The computer processor 402 may thus receive information and instructions from other computing systems or services. The computer processor 402 may also communicate to and from memory 410 and further provide output information for an optional display via the input/output device interface 408. The input/output device interface 408 may also accept input from an optional input device.

The computer readable medium drive 406 may be used in storing data and code. Illustratively, the computer readable medium drive 406 may be a hard drive that stores data and code. In some examples, the computer readable medium drive 406 may be an external hard drive communicatively coupled to the pagination system 108 (e.g., through a cable). Alternatively, the computer readable medium drive 406 may be internal to the pagination system 108. In some examples, the computer readable medium drive 406 may be used to carry out any of the functions described below with respect to memory 410.

The memory 410 may store an operating system 412 that provides computer program instructions for use by the computer processor 402 in the general administration and operation of the pagination system 108. Memory 410 may further include computer program instructions and other information for implementing aspects of the present disclosure. For example, the memory 410 may also include computer program instructions and information for implementing access order determination system 414 and global pagination token generation system 416.

Access order determination system 414 may determine an access order in accordance with which to access multiple data sources, such as data sources 110A-110N of FIGS. 2A-2B. Access order determination system 414 may illustratively determine an access order based on characteristics of a request, such as a task status request or pagination request, as described above with respect to FIGS. 2A-2B. The access order determination system 414 may determine an access order based on characteristics of the request, such as a specified unique identifier for a user, specified unique identifiers for a task or tasks, the like, or some combination thereof. For example, a user represented by a specified unique identifier for the user may store information relating to data sources that are utilized by the user. The pagination system 108 may access this information with the specified unique identifier for a user, such as by requesting corresponding information in another system (e.g., requesting system 106, another data source, etc.). Moreover, a user may indicate a preference for an access order for one or more data sources (e.g., data sources 110A-110N) that are utilized by the user relating to use of one or more data sources. The pagination system 108 may also access this information with the specified unique identifier for a user, such as by requesting corresponding information in another system (e.g., requesting system 106, data sources 110A-110N, etc.). Based on this information, the access order determination system 414 may determine an access order. For example, if the access order determination system 414 identifies that a user has indicated a preferred access order for data sources utilized by the user, the access order determination system 414 may set the user's preferred access order as the preferred access order.

Turning to global pagination token generation system 416, global pagination token generation system 416 may generate global pagination tokens to facilitate provision of results to a request from multiple data sources in a paginated format. As discussed with respect to FIGS. 2A-2B, the pagination system 108 may receive a pagination request corresponding to a task status request and generate a global pagination token to track the progress of obtaining results to the pagination request in subsets including a specified number of results. The global pagination token generation system 416 may both generate an initial global pagination token and update the pagination token as the pagination system 108 obtains or is provided results to the pagination request in subsets from one or more data sources, such as data sources 110A-110N of FIGS. 2A-2B.

The memory 410 may, in some examples, include a pagination API 417, which facilitates accessing and/or obtaining subset(s) of data from one or more data sources (e.g., data sources 110A-110N of FIGS. 1-2B). A requesting system (e.g., requesting system 106 of FIGS. 1-2B) may call the pagination API 417 to access the functionality of pagination system 108. By way of illustration, the requesting system 106 may call the pagination API 417 to submit a pagination request, as described with respect to FIGS. 2A-2B. The pagination API 417 may then communicate with other elements of the pagination system 108, such as access order determination system 414 and global pagination token generation system 416, to generate subsets of results responsive to the pagination request. As another example, an end user (e.g., through a computing device) may call the pagination API 417. The pagination API 417 may then generate subsets of results as described herein.

In some examples, memory 410 may also include a user interface module 418 for generating user interfaces or instructions. The computer processor 402 may access instructions from that memory 410 to generate the display, such as a display for subsets of results obtained by or provided to the pagination system 108 from one or more data sources, such as data sources 110A-110N. The pagination system 108 may, for example, present each subset of results in a sequential fashion. With reference to FIGS. 2A-2B, a first set of task statuses may be presented subsequent to a second set of task statuses. The pagination system 108 may utilize user interface module 418 to present each subset of results on a console visible on a computing device accessible to a user (e.g., a phone, laptop, desktop, etc.). When a user reaches an end to a subset of results, the next subset of results may be presented to the user through the console.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some examples, the computer system may be a cloud-based computing system whose processing resources are shared by multiple distinct business entities or other users.

Depending on the example, certain acts, events, or functions of any of the processes or algorithms described herein can be performed in a different sequence, can be added, merged, or left out altogether (e.g., not all described operations or events are necessary for the practice of the algorithm). Moreover, in certain examples, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the examples disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the examples disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another example, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the examples disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements and/or steps. Thus, such conditional language is not generally intended to imply that features, elements and/or steps are in any way required for one or more examples or that one or more examples necessarily include logic for deciding, with or without other input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various examples, it can be understood that various omissions, substitutions, and changes in the form and details of the devices or algorithms illustrated can be made without departing from the spirit of the disclosure. As can be recognized, certain examples described herein can be embodied within a form that does not provide all of the features and benefits set forth herein, as some features can be used or practiced separately from others. The scope of certain examples disclosed herein is indicated by the appended claims rather than by the foregoing description. All changes which come within the meaning and range of equivalency of the claims are to be embraced within their scope.

What is claimed is:

1. A system comprising:

a memory to store specific computer-executable instructions; and a processor in communication with the memory, wherein the processor executes the specific computer-executable instructions to at least:

receive a pagination request for statuses of tasks being performed by multiple data sources, wherein:

the statuses are provided in response to the pagination request as one or more pages and each page includes a portion of the statuses, the tasks correspond to a unique identifier and each task relates to movement of data between at least two data sources of the multiple data sources;

determine an access order in which the multiple data sources are to be accessed to obtain the statuses of the tasks;

access a first data source of the multiple data sources in the access order;

obtain, from the first data source that is accessed: (i) a first page of statuses including a first portion of the tasks that are being performed by the first data source, and (ii) a local pagination token, wherein the local pagination token indicates an availability, from the first data source, of a second page of statuses;

generate a global pagination token from the access order the local pagination token, and a timestamp, wherein the timestamp indicates a time at which the global pagination token was created, wherein the global pagination token indicates a start point for the second page of statuses;

access at least one data source of the multiple data sources based on the global pagination token; and based on the start point for the second page of statuses indicated in the global pagination token, obtain, from the at least one data source accessed based on the global pagination token, the second page of statuses including a second portion of tasks being performed by the at least one data source.

2. The system of claim 1, wherein:

the local pagination token indicates that the second page of statuses is available from the first data source, the at least one data source that is accessed comprises the first data source in the access order, and the second page of statuses including the second portion of tasks being performed by the at least one data source is obtained from the first data source and comprises a second page of statuses including a second portion of tasks being performed by the first data source.

3. The system of claim 1, wherein:

the local pagination token indicates that a second page of statuses is not available from the first data source, the at least one data source that is accessed comprises a second data source of the multiple data sources in the access order, wherein the second data source is different than the first data source, and the second page of statuses including the second portion of tasks being performed by the at least one data source is obtained from the second data source and comprises a second page of statuses including a second portion of tasks being performed by the second data source.

4. The system of claim 2, wherein:

an updated local pagination token is obtained from an $n^{th}-1$ data source, the updated local pagination token indicates that an $n^{th}$ page of statuses is not available from the $n^{th}-1$ data source, and the processor executes further specific computer-executable instructions to at least:

generate an updated global pagination token from the access order and the updated local pagination token, wherein the updated global pagination token indicates a start point for an $n^{th}$ page of statuses of the tasks;

access an $n^{th}$ data source of the multiple data sources based on the global pagination token; and based on the start point for the $n^{th}$ page of statuses indicated in the global pagination token, obtain, from the $n^{th}$ data source, the $n^{th}$ page of statuses for an $n^{th}$ portion of tasks being performed by the $n^{th}$ data source.

5. The system of claim 1, wherein to generate the global pagination token, the processor executes further specific computer-executable instructions to at least:

encrypt the access order, the timestamp, and the local pagination token; and encode the access order, the timestamp, and the local pagination token that have been encrypted.

6. A computer-implemented method comprising:

receiving a request for data regarding tasks being performed by multiple data sources;

obtaining, from a first data source of the multiple data sources: (i) a first subset of the data, wherein the first subset of the data regarding tasks being performed by the multiple data sources comprises a subset of data regarding tasks being performed by the first data source, and (ii) a local availability token, wherein the local availability token indicates an availability, from the first data source, of additional data regarding the tasks being performed by the first data source;

generating a global availability token from the local availability token, wherein the global availability token indicates: (i) a start point of a second subset of the data regarding tasks being performed by the multiple data sources, and (ii) a second data source of the multiple data sources from which to obtain the second subset of the data regarding tasks being performed by the multiple data sources; and obtaining, from the second data source beginning at the start point indicated by the global availability token, the second subset of the data regarding tasks being performed by the multiple data sources, wherein the second subset of the data regarding tasks being performed by the multiple data sources comprises a subset of data regarding tasks being performed by the second data source.

7. The computer-implemented method of claim 6, wherein:

the local availability token indicates that additional data regarding the tasks being performed by the first data source is available from the first data source, the first data source is the same as the second data source, and the second subset of the data regarding tasks being performed by the multiple data sources comprises a second subset of data regarding tasks being performed by the first data source.

8. The computer-implemented method of claim 6, wherein:

the local availability token indicates that additional data regarding the tasks being performed by the first data source is not available from the first data source, the first data source is different than the second data source, and the second subset of the data regarding tasks being performed by the multiple data sources comprises a subset of data regarding tasks being performed by the second data source.

9. The computer-implemented method of claim 7, further comprising:

obtaining an updated local availability token from an $n^{th}-1$ data source, wherein the updated local availability token indicates that additional data regarding the tasks being performed by the $n^{th}-1$ data source is not available from the $n^{th}-1$ data source;

generating an updated global availability token from the updated local availability token, wherein the updated global availability token indicates: (i) a start point for an $n^{th}$ subset of the data regarding tasks being performed by the multiple data sources, and (ii) an $n^{th}$ data source of the multiple data sources from which to obtain the $n^{th}$ subset of the data regarding tasks being performed by the multiple data sources; and obtaining, from the $n^{th}$ data source beginning at the start point indicated by the updated global availability token, the $n^{th}$ subset of the data regarding tasks being performed by the multiple data sources, wherein the $n^{th}$ subset of the data regarding tasks being performed by the multiple data sources comprises a subset of data regarding tasks being performed by the $n^{th}$ data source.

10. The computer-implemented method of claim 6, wherein the tasks for which data is requested correspond to a unique identifier.

11. The computer-implemented method of claim 6, further comprising determining an order for the multiple data sources in which the data regarding tasks being performed by the multiple data sources is to be obtained.

12. The computer-implemented method of claim 11, wherein the global availability token is generated from the local availability token and the order of the second subset of the data regarding tasks being performed by the multiple data sources, and wherein generating the global availability token further comprises:

encrypting the order, the local availability token, and a timestamp, wherein the timestamp indicates a time that the global availability token was created; and encoding the order, the local availability token, and the timestamp that have been encrypted.

13. The computer-implemented method of claim 6, further comprising outputting the first subset of the data via a user interface.

14. The computer-implemented method of claim 13, further comprising outputting the second subset of the data via the user interface following the first subset of the data.

15. The computer-implemented method of claim 11, wherein receiving a request for data regarding tasks being performed by multiple data sources comprises receiving the request via an API.

16. A non-transitory computer-readable medium storing instructions that, when executed, cause a computing system to perform operations comprising:

receiving a request for data regarding tasks being performed by multiple data sources;

obtaining, from a first data source of the multiple data sources: (i) a first subset of the data, wherein the first subset of the data regarding tasks being performed by the multiple data sources comprises a subset of data regarding tasks being performed by the first data source, and (ii) a local availability token, wherein the local availability token indicates an availability, from the first data source, of additional data regarding the tasks being performed by the first data source;

generating a global availability token from the local availability token and an access order in which the multiple data sources are to be accessed to obtain the data regarding the tasks, wherein the global availability token indicates: (i) a start point of a second subset of the data regarding tasks being performed by the multiple data sources, and (ii) in accordance with the access order, a second data source of the multiple data sources from which to obtain the second subset of the data regarding tasks being performed by the multiple data sources; and obtaining, from the second data source beginning at the start point indicated by the global availability token, the second subset of the data regarding tasks being performed by the multiple data sources, wherein the second subset of the data regarding tasks being performed by the multiple data sources comprises a subset of data regarding tasks being performed by the second data source.

17. The non-transitory computer-readable medium of claim 16, wherein:

the local availability token indicates that additional data regarding the tasks being performed by the first data source is available from the first data source, the first data source is the same as the second data source, and the second subset of the data regarding tasks being performed by the multiple data sources comprises a second subset of data regarding tasks being performed by the first data source.

18. The non-transitory computer-readable medium of claim 16, wherein:

the local availability token indicates that additional data regarding the tasks being performed by the first data source is not available from the first data source, the first data source is different than the second data source, and the second subset of the data regarding tasks being performed by the multiple data sources comprises a subset of data regarding tasks being performed by the second data source.

19. The non-transitory computer-readable medium of claim 16, wherein the instructions, when executed, further cause a computing system to perform operations further comprising:

obtaining an updated local availability token from an $n^{th}-1$ data source, wherein the updated local availability token indicates that additional data regarding the tasks being performed by the $n^{th}-1$ data source is not available from the $n^{th}-1$ data source;

generating an updated global availability token from the updated local availability token and the access order, wherein the updated global availability token indicates: (i) a start point for an $n^{th}$ subset of the data regarding tasks being performed by the multiple data sources, and (ii) in accordance with the access order, an $n^{th}$ data source of the multiple data sources from which to obtain the $n^{th}$ subset of the data regarding tasks being performed by the multiple data sources; and obtaining, from the $n^{th}$ data source beginning at the start point indicated by the updated global availability token, the $n^{th}$ subset of the data regarding tasks being performed by the multiple data sources, wherein the $n^{th}$ subset of the data regarding tasks being performed by the multiple data sources comprises a subset of data regarding tasks being performed by the $n^{th}$ data source.

20. The non-transitory computer-readable medium of claim 16, wherein:

the data regarding being performed by the multiple data sources comprises statuses of tasks being performed by multiple data sources, and each task relates to movement of data between at least two data sources of the multiple data sources.

* * * * *